United States Patent
Jeromin

(10) Patent No.: US 10,481,689 B1
(45) Date of Patent: Nov. 19, 2019

(54) MOTION CAPTURE GLOVE

(71) Applicant: Electronic Arts Inc., Redwood City, CA (US)

(72) Inventor: Aaron Chandler Jeromin, Austin, TX (US)

(73) Assignee: Electronic Arts Inc., Redwood City, CA (US)

( * ) Notice: Subject to any disclaimer, the term of this patent is extended or adjusted under 35 U.S.C. 154(b) by 32 days.

(21) Appl. No.: 15/867,375

(22) Filed: Jan. 10, 2018

(51) Int. Cl.
*G06F 3/01* (2006.01)
*G01D 5/14* (2006.01)
*G06T 7/73* (2017.01)
*G06T 13/40* (2011.01)

(52) U.S. Cl.
CPC ............ *G06F 3/014* (2013.01); *G01D 5/145* (2013.01); *G06T 7/73* (2017.01); *G06T 13/40* (2013.01); *G06T 2207/10016* (2013.01); *G06T 2207/30196* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 8,246,462 B1 * | 8/2012 | Tran | ........................ | G06F 3/014 345/156 |
| 9,717,216 B1 * | 8/2017 | Schlachta | ............ | A01K 11/008 |
| 2010/0236077 A1 * | 9/2010 | Shirey | ....................... | B26B 1/02 30/152 |
| 2012/0025945 A1 * | 2/2012 | Yazadi | ................ | H04L 67/1095 340/4.2 |
| 2014/0358263 A1 * | 12/2014 | Irmler | ..................... | G06F 3/014 700/94 |
| 2015/0289994 A1 * | 10/2015 | Engeberg | ................ | A61F 2/586 623/57 |
| 2016/0191887 A1 * | 6/2016 | Casas | ................... | H04N 13/296 348/47 |
| 2016/0265985 A1 * | 9/2016 | Onal | ........................ | G01L 1/122 |
| 2017/0043804 A1 * | 2/2017 | Mangette | ............. | B62D 5/0481 |
| 2017/0249561 A1 * | 8/2017 | Abdallah | ............... | B25J 9/1664 |
| 2018/0210955 A1 * | 7/2018 | Crabtree | ................. | H04L 67/12 |

OTHER PUBLICATIONS

Virtual Realities, LLC "Patriot—Virtual Reality Motion Tracker" Https://www.vrealities.com/products/magnetic/patriot-2. Online; accessed Oct. 20, 2017 in 4 pages.

* cited by examiner

*Primary Examiner* — Frank S Chen
(74) *Attorney, Agent, or Firm* — Knobbe, Martens, Olson & Bear LLP

(57) ABSTRACT

A motion capture glove may use a set of sensors to detect the motion of fingers. Pairs of magnets and magnetic sensors may be positioned along portions of a hand that are capable of movement or bending. For example, a magnet may be positioned on one side of a top of the joint and a magnetic sensor on the opposite side of the top of the joint. As a user bends the finger, the sensor is moved further away from the magnet. An electrical signal generated by the sensor may vary as the distance between the sensor and the magnet varies. The strength of the electrical signal may be used to determine a configuration of the joint. A determination of the configuration of each joint may be used to determine a configuration of a hand, which can be used to generate an animation of motion capture clip.

20 Claims, 10 Drawing Sheets

MOTION CAPTURE GLOVE

BACKGROUND

Animation often includes characters that are representative of humans or animals. It is often desirable for animated characters to move similarly to corresponding real-world characters, for example, humans or other types of animals. It is particularly desirable for many types of video games that the character animation in the videogame look as realistic as possible. Often, to create realistic looking animation that mimics the motion of real world people or animals a motion capture process may be performed. Motion capture may include recording the movement of real-life humans or animals and mapping the recorded movements to animated characters.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments of the present disclosure, a motion capture glove is disclosed. The motion capture glove may include a glove configured to at least partially cover a hand of a user and a set of joint magnetic sensor systems attached to the glove, wherein a first joint magnetic sensor system from the set of joint magnetic sensor systems is positioned such that the joint magnetic sensor system is located above a joint of the hand when the glove is worn by the user, wherein each of the other joint magnetic sensor systems from the set of joint magnetic sensor systems is positioned over a different joint of the hand than the first joint magnetic sensor system, wherein the first joint magnetic sensor system produces a voltage signal based at least in part on a position of a first magnetic sensor with respect to a first corresponding magnet of the first joint magnetic sensor system, and wherein the voltage signal corresponds to a configuration of the joint of the hand when the glove is worn by the user.

In some embodiments, the motion capture glove further includes a set of inter-digit magnetic sensor systems attached to the glove, wherein each inter-digit magnetic sensor system is positioned between a pair of digits of the hand when the glove is worn by the user. Moreover, in some cases, at least one inter-digit magnetic sensor system of the set of inter-digit magnetic sensor systems comprises a three dimensional sensor, wherein the three dimensional sensor is configured to determine a location of the three dimensional sensor relative to a corresponding magnet.

Some implementations of the motion capture glove further include one or more thumb magnetic sensor systems attached to the glove, wherein the one or more thumb magnetic sensor systems provide one or more voltage values reflective of a rotation of a thumb of the hand with respect to a palm of the hand. In some implementations, the set of joint magnetic sensor systems comprise Hall Effect sensors. Further, the glove may comprise flexible circuitry. Moreover, the glove may comprise a set of flexible joint sheaths that house the set of joint magnetic sensor systems.

In some embodiments, the motion capture glove further comprises a wireless transceiver configured to communicate data that is based at least in part on one or more signals generated by the set of joint magnetic sensor systems to a computing device configured to determine a physical configuration of the hand based at least in part on the one or more signals. Moreover, at least some of the joint magnetic sensor systems may comprise a hinged sensor system comprising a magnetic sensor and a neodymium magnet. In addition, in some cases, the hinged sensor system includes a gap between the magnetic sensor and the neodymium magnet enabling the hinge to bend at least partially backward when the glove is worn by the user and the user is capable of bending a digit at least partially towards a dorsum of the hand from an open flat position.

In certain embodiments of the present disclosure, a motion capture system is disclosed. The motion capture system may include a motion capture glove and a motion capture glove processor. The motion capture glove may include a glove configured to at least partially cover a hand of a user and a set of magnetic sensor systems attached to the glove, wherein a first magnetic sensor system of the set of magnetic sensor systems generates a first signal based at least in part on a location of a first corresponding magnet, the first signal indicative of a configuration of a first portion of the hand of the user. The motion capture glove processor may be configured to receive the first signal generated by the first magnetic sensor system and to determine the configuration of the first portion of the hand of the user based at least in part on the first signal and one or more hand configuration tables that map the first signal to the configuration of the first portion of the hand.

In some embodiments, the motion capture system includes a motion capture marker attached to the motion capture glove, wherein a motion capture video processor determines a location of the hand in a coordinate space based at least in part on a determination of a location of the motion capture marker. Further, in some embodiments, the motion capture system includes a motion capture video processor configured to generation a motion capture animation clip based at least in part on the configuration of the first portion of the hand.

In some implementations, a second magnetic sensor system of the set of magnetic sensor systems generates a second signal based at least in part on a location of a second corresponding magnet, the second signal indicative of a configuration of a second portion of the hand of the user that differs from the first portion of the hand, and wherein the motion capture glove processor is further configured to receive the second signal generated by the second magnetic sensor system and to determine the configuration of the second portion of the hand of the user based at least in part on the second signal and one or more hand configuration tables that map the second signal to the configuration of the second portion of the hand. Moreover, the motion capture system may include a microcontroller configured to read the first signal from the first magnetic sensor system and to provide the first signal to the motion capture glove processor. In addition, the motion capture system may include a multiplexer configured to read signals produced by the set of magnetic sensor systems and to distribute the first signal to a microcontroller responsive to a request for a signal from the first magnetic sensor.

In certain embodiments of the present disclosure, a computer-implemented motion capture method is disclosed. The method may include receiving an electrical signal from a magnetic sensor system of a motion capture glove; determining a hand configuration table corresponding to the magnetic sensor; determining from the hand configuration table at least a partial position of a digit of a hand wearing the motion capture glove based at least in part on the electrical signal; accessing a global time code; associating the global time code with the partial position of the digit of the hand; and generating a motion capture video clip based at least in part on the partial position of the digit of the hand and the global time code.

In some embodiments, the electrical signal comprises a voltage signal. Further, the method may include detecting a location of a motion capture marker attached to the motion capture glove; and determining a location of the motion capture glove in a coordinate space based at least in part on the location of the motion capture marker, wherein the motion capture video clip is based at least in part on the location of the motion capture glove in the coordinate space. In addition, the method may include calibrating the motion capture glove by at least: determining a first electrical signal of the magnetic sensor system when the hand is in a first position corresponding to a completely open hand; determining a second electrical signal of the magnetic sensor system when the hand is in a second position corresponding to a closed fist; performing an interpolation process based at least in part on the first electrical signal determined when the hand is in the first position and the second electrical signal determined when the hand is in the second position to determine a plurality of electrical signals corresponding to a plurality of hand configurations between the completely open hand and the closed fist; and generating the hand configuration table based at least in part on a result of the interpolation process.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
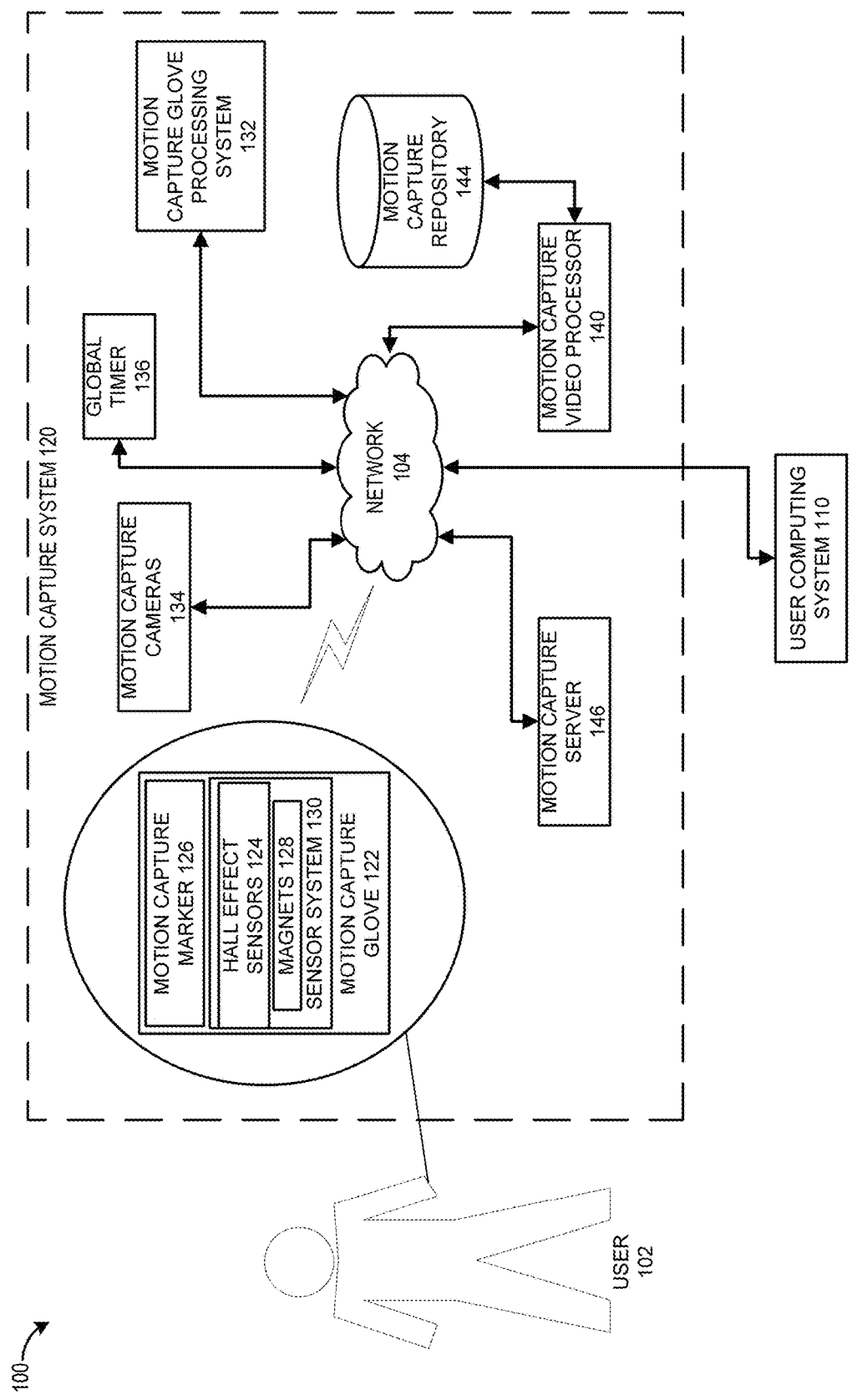
FIG. 1 illustrates an embodiment of a motion capture environment that can implement one or more embodiments of a motion capture system.

One method of obtaining motion capture clips or data, which may be referred to as MOCAP clips or data, is to position markers on a person, which may be recorded by one or more cameras. The motion capture markers may be positioned on a motion capture suit worn by the person. The motion capture markers are often relatively large and can be detected by cameras or other image processing sensors. Based on the detection of the location of the markers in a coordinate space, motion of the person wearing the sensors can be determined. For example, based on the detection of a motion capture marker on an arm, it can be determined that the arm is moving and how the arm is moving. This captured and/or determined data may be included as part of the MOCAP data and can be used to create MOCAP data clips. These MOCAP data clips may be used to generate video or animation.

One problem with the use of the motion capture markers is that their relatively large size prevents or makes their use impractical for detecting the motion of digits of the hand. The markers may completely cover one or more joints of the hand preventing detection of the movement of the one or more joints. Shrinking the markers is often not possible or practicable. For example, placing a marker on each digit joint would substantially increase the amount of motion capture data greatly increasing the amount of computing resource required to process the data. Further, reducing the number of markers to reduce the MOCAP data will result in less accurate and less robust data. Moreover, the markers may easily be occluded by, for example, crossing hands, making a fist, or moving the hands around the user's body. Further, the use of a motion capture marker on each joint can lead to marker swapping, or merging. Marker swapping may occur when two or more markers are physically close enough to one another, or a pattern of moption capture markers is similar enough to another cluster of motion capture markers, that they are confused by a motion capture marker tracking system or are merged together resulting in data loss.

Another solution is to create a motion capture glove that uses resistive flex strips. However, the resistive flex strips are prone to breakage and introduce a lot of noise into the captured data. Similar problems occur with fiber optic based solutions.

Embodiments disclosed herein include a motion capture glove that uses magnetic sensors, such as Hall Effect sensors or Anisotropic Magneto-Resistive (AMR) sensors, to detect the movement of the digits of a hand inserted into the motion capture glove. Additional embodiments disclosed herein describe processes for calibrating the motion capture glove and for determining the configuration of the user's hand based at least in part on data obtained by the motion capture glove.

Advantageously, in certain embodiments, the motion capture glove with the magnetic sensors does not suffer from the previously described problems and can provide more accurate data with less noise compared to other solutions. Further the use of magnetic sensors enables the creation of a motion capture glove that is less prone to breakage than other solutions, which can be important for some desired MOCAP actions that may include the motion capture glove colliding or impacting with an object.

In certain embodiments, the motion capture glove includes a set of magnetic sensors positioned such that when a user wears the motion capture glove a magnetic sensor system is positioned with respect to each joint of each digit of the user's hand. Typically, although not necessarily, the magnetic sensor system is positioned to surround the top of the joint. Further, one or more magnetic sensors may be positioned between each pair of digits of the user's hand. In certain embodiments, the one or more magnetic sensors of the motion capture glove are part of a magnetic sensor system that comprises the magnetic sensor and a corresponding magnet. The magnetic sensor system can produce an electrical signal (for example, a voltage or a current signal) based at least in part on a position of the magnetic sensor with respect to the corresponding magnet. Based at least in part on the electrical signal, embodiments disclosed herein can determine a configuration of the user's hand. This determined configuration of the user's hand can be used to create realistic or life-like animation corresponding to the real-world user's hand.

Although motion capture may be used with animals or other movable objects, to simplify discussion and not to limit the present disclosure, this disclosure will focus on human users. However, it should be understood that certain embodiments disclosed herein may be used to capture the movement of nonhuman animals or other movable objects. Further, although embodiments disclosed herein can be used with other body parts that have relatively small surface area, small joints, or many joints (for example, feet), to simplify discussion and not to limit the present disclosure, this disclosure will primarily focus on hands of human users.

Example Motion Capture Environment

FIG. 1 illustrates an embodiment of a motion capture environment 100 that can implement one or more embodiments of a motion capture system. The motion capture environment 100 may include a motion capture system 120. Further, the motion capture environment 100 may include a user computing system 110 that is separate from the motion capture system 120 or, in some embodiments, may be included as part of the motion capture system 120.

The motion capture system 120 may include a motion capture glove 122 that, as indicated by the callout bubble, can be worn on a hand of a user 102. The motion capture glove 122 may include a number of Hall Effect sensors 124, which may be sensitive to a magnetic field. A Hall Effect sensor 124 may produce an electrical current or voltage based on the strength of the magnetic field detected by the Hall Effect sensor 124. As used herein, the Hall Effect sensors 124 are linear Hall Effect sensors that provide a varying analog voltage, rather than a Boolean on/off state as is produced by some Hall Effect sensors. The analog voltage may vary based on a distance of a Hall Effect sensor 124 from a magnet 128. However, in certain optional embodiments, one or more of the sensors may be Boolean-type Hall Effect sensors that provide a signal when within a particular distance from a magnet. In some embodiments, the Hall Effect sensors 124 may be replaced by or supplemented by other types of magnetic sensors, such as AMR sensors.

The Hall Effect sensors 124 may be paired with one or more corresponding magnets 128 as part of a sensor system 130 of the motion capture glove 122. The magnets may be neodymium magnets. In other embodiments, different types of magnets may be used. Generally, although not necessarily, magnets are selected that will provide a strong enough magnetic field to be detected by a Hall Effect sensor 124 paired with the magnet, but not detected, or detected at a lower strength, by other sensors 124 of the motion capture glove 122. For example, referring to FIG. 3, a magnet on the right-most digit may be strong enough to be detected by a paired sensor, but not strong enough to be detected by a sensor on a neighboring digit. In some embodiments, a sensor on the neighboring digit may detect the magnet on the right-most digit, but at a sufficiently low enough strength to be filtered or ignored by a microcontroller receiving the signals generated by the sensors in response to detecting the magnetic fields.

Returning to FIG. 1, as the user 102 moves his or her hand, or digits of the hand, the distance or location of the magnets 128 with respect to one or more Hall Effect sensors 124 may change. This change in position or location of the magnets 128 with respect to the one or more Hall Effect sensors 124 may cause the Hall Effect sensors 124 to create different electrical signals, such as different voltage or current signals. These electrical signals may be communicated to the motion capture glove processing system 132, which can determine a configuration of a hand of the user 102 inserted into the motion capture glove 122 based at least in part on the received electrical signals.

In certain embodiments, the motion capture glove 122 may also include a motion capture marker 126. The motion capture marker 126 may be used to determine a location of a hand of the user 102 within a coordinate space. In other words, in certain embodiments, the motion capture marker 126 of the motion capture glove 122 may be used to determine where a user's hand is located, and the sensor system 130 of the motion capture glove 122 may be used to determine the configuration of the user's hand, for example whether the user has balled his or her hand into a fist, configured the hand to look like an imaginary gun, or configured his or her hand to mimic the Vulcan salute used by Spock in Star Trek®. The motion capture marker 126 may be located on a portion of the motion capture glove 122 that covers the dorsum, or the back of the palm, when worn on a hand of the user 102.

The motion capture system 120 may include one or more motion capture cameras 134. The motion capture cameras 134 can record the location of the motion capture marker 126 to determine the location of a hand of the user 102 within a particular area or coordinate space.

In some embodiments, different systems within the motion capture system 120 may be responsible for recording the movement or motions of different parts of the body of the user 102. For example, the motion capture cameras 134 may determine the location of different parts of the body of the user 102 while the motion capture glove processing system 132 may determine the configuration of the hand of the user 102. Further, different movements made by the user 102 may be recorded multiple times or from different angles. To facilitate putting together the motion capture data, to create the different motion capture clips, and/or to coordinate the timing of the different motion capture clips when creating an animation, can be important to keep track of timing motion capture data from one source with respect to motion capture data from another source. The motion capture system 120 include a global timer 136, which can associate timing data with a different motion capture data obtained by the one or more systems of the motion capture system 120 including motion capture data obtained from the motion capture glove 122. Advantageously, in certain embodiments, the global timer 136 applying timing data to the data obtained from the motion capture glove 122 enables the configuration of the hand of the user 102 to be coordinated with motion capture data relating to the movement of the hand within a coordinate space or to the movement of the user 102.

The motion capture glove 122 may communicate with other systems of the motion capture system 120. In some cases, the motion capture glove 122 may communicate directly with another system, such as the motion capture glove processing system 132. In other cases, the motion capture glove 122 may communicate with another system via the network 104. Typically, the motion capture glove 122 communicates wirelessly with the network 104, or other systems of the motion capture system 120. However, in some embodiments, the motion capture glove 122 may communicate via a wired connection to a network 104 or other system of the motion capture system 120. Although illustrated as part of the motion capture system 120, the network 104 may be independent of or external to the motion capture system 120. Alternatively, the motion capture system 120 may include a portion of the network 104 and another portion of the network 104 may be external to the motion capture system 120.

The motion capture system 120 may further include a motion capture video processor 140. The motion capture video processor 140 may include a system for generating motion capture video or motion capture clips based at least in part on motion capture data. This motion capture data may include the motion capture data generated by the motion capture glove 122 and/or motion capture data generated by the motion capture glove processing system 132 based at least in part on the data or signals obtained from the motion capture glove 122. Further, in certain embodiments, the motion capture video processor 140 may generate the motion capture video based at least in part on motion capture data captured or determined by the motion capture cameras 134, which may record or determine locations of one or more motion capture markers attached to the user 102. In some cases, the motion capture markers recorded are tracked by the motion capture cameras 134 may include the motion capture marker 126 of the motion capture glove 122. However, the motion capture cameras 134 are not limited to monitoring the motion capture marker 126 and may track additional motion capture markers attached to the user 102 where motion capture suit (not shown) worn by the user 102.

The motion capture video processor 140 may store the motion capture data and/or the motion capture clips generated based at least in part on motion capture data to motion capture repository 142. Further, in some embodiments, the motion capture glove processing system 132 may store motion capture data obtained from the motion capture glove 122 at the motion capture repository 142.

The motion capture system 120 may further include a motion capture server 146. The motion capture server 146 may be used to combine motion capture clips to create a motion capture animation. In some embodiments the motion capture clips may be of different portions of the user 102. For example, a motion capture clip relating to a hand animation may be combined with a motion capture clip relating to movement of the arms and torso of the user 102 and the motion capture clip relating to the facial expressions of the user 102. In some embodiments, the motion capture server 146 may combine the different motion capture clips based at least in part on timing information applied to the different motion capture clips by the global timer 136.

The motion capture data obtained using the motion capture glove 122, or other motion capture data or motion capture clips generated by the motion capture system 120, may be presented to a user of the user computing system 110. In some embodiments, the user computing system 110 may be a workstation or other computing system used by an animator or developer's interact with motion capture data obtained by the motion capture system 120. In other embodiments, the user computing system 110 may be a video game computer or a video game system that can play animation generated based at least in part on the data obtained by the motion capture system 120 as part of a video game.

The user computing system 110 may include hardware and software components for establishing communication with another computing system, such as the motion capture system 120, over a communication network 104. For example, the user computing system 110 may be equipped with networking equipment and network software applications (for example, a web browser) that facilitate communications via a network (for example, the Internet) or an intranet. The user computing system 110 may include a number of local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 9 and FIG. 10.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet. Moreover, although illustrated as part of the motion capture system 120, the network 104 may be independent of or external from the motion capture system 120.

Example Motion Capture Glove

Figure 2:
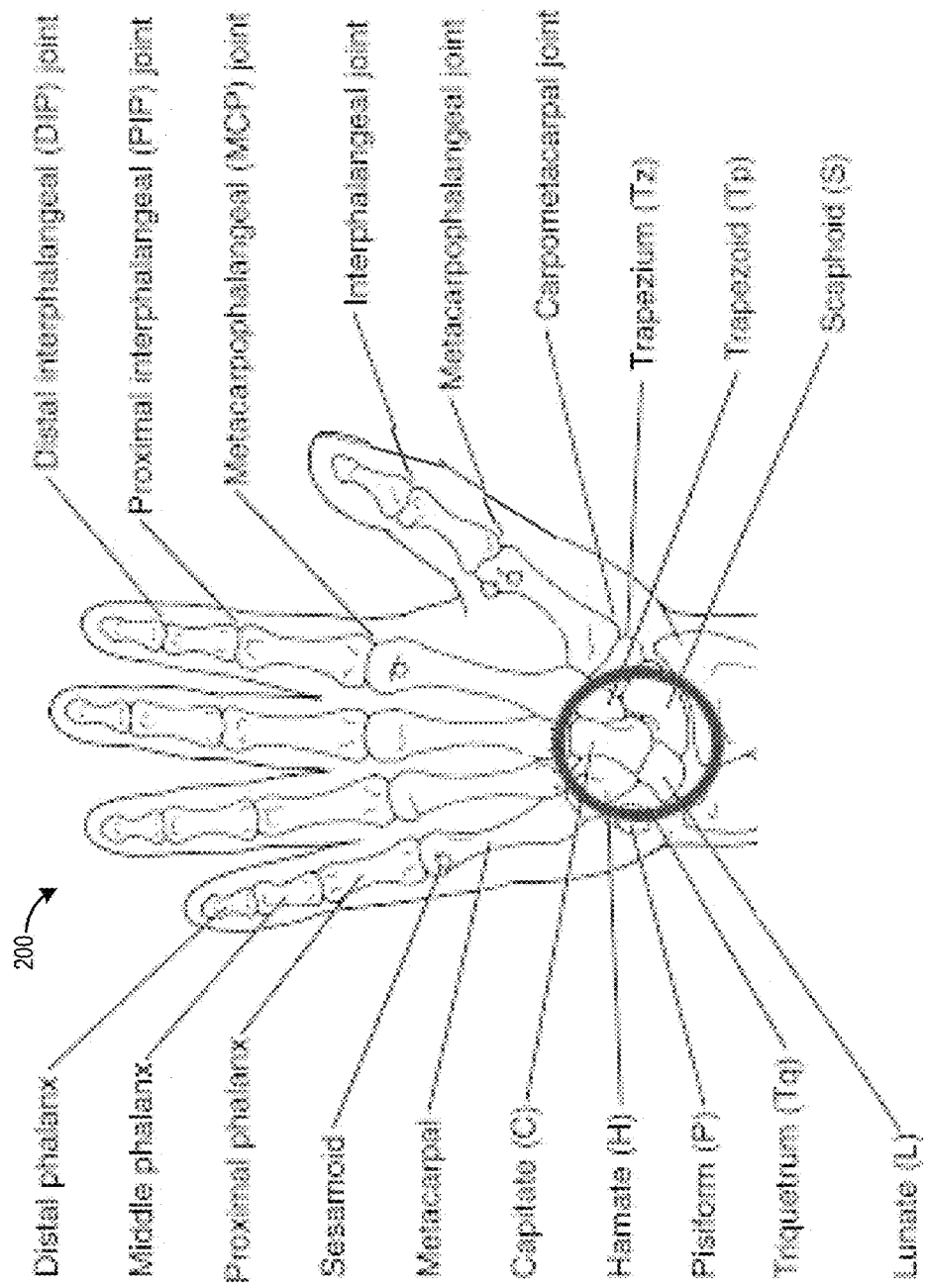
FIG. 2 depicts an image of a bone structure of a human hand.

The motion capture glove 122 is configured to position a number of sensors systems 130 with respect to a number of joints of a human hand. FIG. 2 depicts an image of a bone structure 200 of a human hand. As illustrated by the bone structure 200, each digit of the human hand includes three joints. In some embodiments, the motion capture glove 122 includes a sensor system 130 for each joint of the digits of the human hand. In other embodiments, the motion capture glove 122 may include more or fewer sensors systems 130.

Figure 3:
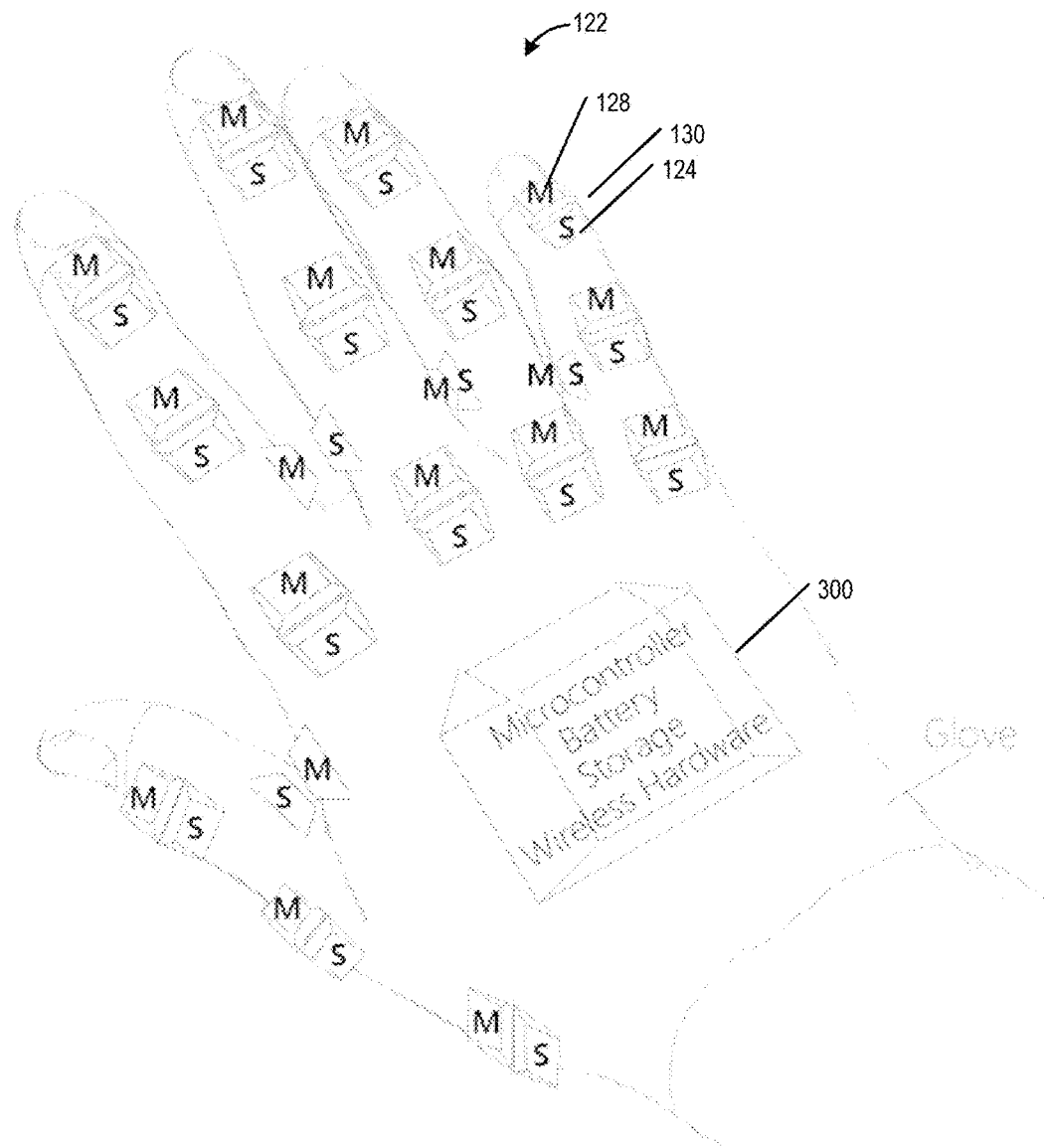
FIG. 3 illustrates an embodiment of a motion capture glove that may be used within the motion capture environment of FIG. 1.

FIG. 3 illustrates an embodiment of a motion capture glove 122 that may be used within the motion capture environment of FIG. 1. As illustrated, the motion capture glove 122 includes three sensor systems 130, represented by a magnet 128 and a sensor 124, for each digit of the hand. To reduce clutter within FIG. 3, a set of reference numerals are applied to an example of the sensors systems 130, but are omitted from a number of the other sensors systems 130 illustrated in the figure. Each of the sensors systems 130 located above a joint of one of the digits may be referred to as a joint sensor system or a joint magnetic sensor system.

In some embodiments, in addition to the joint sensor systems, one or more sensors systems 130 may be positioned between digits of the hand. The sensors systems 130 between the digits of the hand may be referred to as inter-digit sensor systems or inter-digit magnetic sensor systems. The terms joint sensor system or joint magnetic sensor system and the terms inter-digit sensor system or inter-digit magnetic sensor system are for ease of description and are not intended to be limiting.

In some embodiments, the joint sensor systems may include a hinge that binds the magnet 128 to the sensor 124 while allowing the space between the magnet 128 and the sensor 124 to vary as a user flexes or bends the corresponding joints of the hand. In certain embodiments, the hinge enables the magnet 128 and sensor 124 to move within a defined range. In contrast, the inter-digit sensor system may, in certain embodiments, not include a hinge or other connector between the magnet 128 and the sensor 124 of the inter-digit sensor system. Advantageously, in certain embodiments, by not binding the magnet 128 to the sensor 124 for the inter-digit sensor system, the user maintains the full range of motion of one digit with respect to another digit.

A motion capture glove 122 may include up to 19 sensor systems 130. There may be three sensor systems for each digit. Further there may be up to four inter-digit sensor systems, one between each pair of digits. However, in certain embodiments, the motion capture glove 122 may include more or fewer sensors systems. For example, in certain embodiments, there may be one or more sensors systems 130 positioned around the wrist area of the motion capture glove 122 enabling the motion capture glove 122 to measure the movement of the hand with respect to the forearm. As another example, there may be additional inter-digit sensor systems to more accurately record motion of one digit with respect to a neighboring digit.

The motion capture glove 122 may further include a set of supporting hardware 300. This supporting hardware may include a microcontroller that can obtain sensor readings from each of the sensors 124 of the sensors systems 130 of the motion capture glove 122. In certain embodiments, the microcontroller may include one or more multiplexers to enable selective reading of one or more of the sensors 124 of the motion capture glove 122. In some embodiments, the microcontroller may convert the sensor signals into data indicating a configuration of the portion of the hand corresponding to the one or more sensors 124 that provided the sensor signals.

In addition, the supporting hardware 300 may include storage configured to store sensor signals received from the sensors 124. Alternatively, or in addition, the storage may be configured to store motion capture data derived from the sensor signals. The sensor signals may comprise one or more electrical signals derived based on a relation between the sensor 124 and a corresponding magnet 128.

In some embodiments, the signal received from a sensor 124 may include noise. This noise may be caused by magnets from other sensors systems included as part of the motion capture glove 122. For example, the sensor positioned above the proximal interphalangeal joint of the rightmost digit of the hand illustrated in FIG. 3 (the digit sometimes referred to as a pinky) may detect a magnetic field generated by a magnet of the sensor system positioned above the distal interphalangeal joint of the rightmost digit. In certain embodiments, supporting hardware 300 may include one or more filters configured to filter noise from the signals obtained from the sensors 124.

The supporting hardware 300 may further include wireless hardware enabling the motion capture glove 122 to communicate to the motion capture glove processing system 132. In some embodiments, the microcontroller obtains a signal from a sensor 124 and wirelessly communicates the value of the signal to the motion capture glove processing system 132 for further processing. Alternatively, or in addition, the microcontroller converts the signal from the sensor 124 to a particular data value, which the microcontroller can wirelessly communicate to the motion capture glove processing system 132.

To power the hardware of the motion capture glove 122, the motion capture glove 122 may include a battery. This battery may be an alkaline battery, a lithium-ion battery, or any other type of power source that may power the motion capture glove 122 without making the motion capture glove 122 too heavy for continued use by the user 102.

Figure 4:
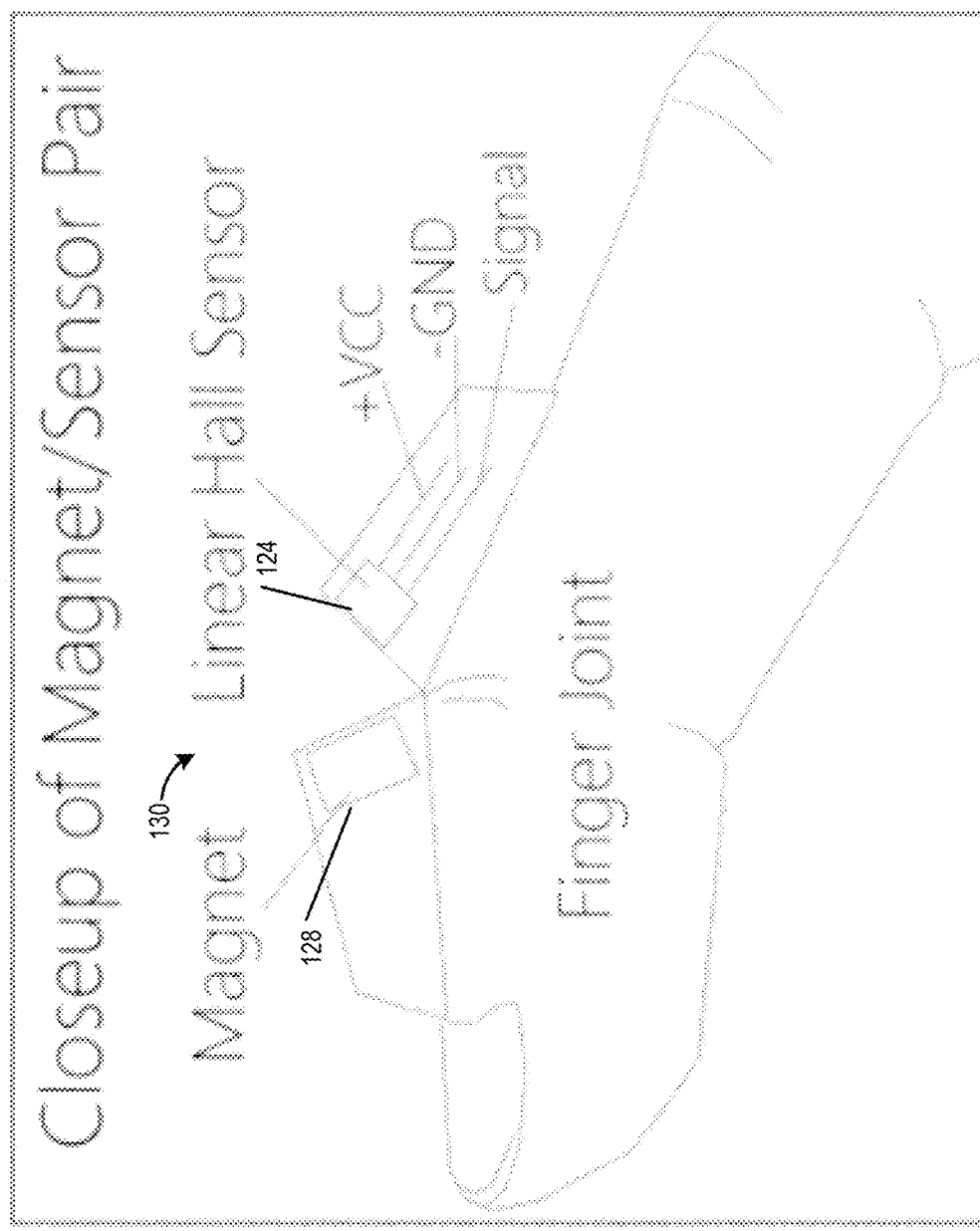
FIG. 4 illustrates an embodiment of a joint magnetic sensor system that may be used with the motion capture glove of FIG. 3.

FIG. 4 illustrates an embodiment of a joint magnetic sensor system 130 that may be used with the motion capture glove of FIG. 3. As illustrated, the sensor system 130 is positioned around a joint of a digit. The magnet 128 may be positioned on one side of the joint and the sensor 124 may be positioned on the other side of the joint. When the digit is straight and the joint is not bent the sensor 124 may be a particular distance from the magnet 128. In some cases, there is no space between the sensor 124 and the magnet 128 when the digit is straight. In other cases there may be some space between the sensor 124 and the magnet 128 even when the digit is straight to enable the digit to bend without the magnet 128 and the sensor 124 blocking are pushing away from each other. Generally, the distance between the sensor 124 and the magnet 128 is closest when the digit is straight. When the sensor 124 is within the particular distance of the magnet 128 a signal, such as a voltage, may be generated of a particular intensity. By recording the particular intensity of the signal, it can be determined that the corresponding joint of the digit is not bent.

As a user bends the digit causing the joint to bend or curve, the sensor 124 will become further away from the magnet 128 creating a larger gap between the sensor 124 and the magnet 128. As the gap widens between the sensor 124 and the magnet 128, the signal, such as the voltage, will be of a lower intensity than when the joint is not bent or when the sensor 124 is closer to the magnet 128.

Although the sensor system 130 illustrated in FIG. 4 is a joint sensor, the inter-digit sensors work similarly. As a user spreads a pair of digits further apart from each other, the signal intensity obtained by the sensor 124 in response to the magnetic field of the magnet 128 decreases indicating the widening gap between the digits. Vice versa, as the user brings a pair of digits closer together, the signal intensity obtained by the sensor 124 responsive to the magnetic field of the magnet 128 increases indicating the narrowing gap between the digits.

The sensor 124 may include a number of electrical signal lines. For example, the sensor 124 may include a power line, a ground line, and a signal line for transmitting a signal based on a distance between the sensor 124 and the magnet 128. It should be understood that the sensor illustrated in FIG. 4 is one non-limiting example of a linear Hall Effect sensor that may be used with embodiments of the present disclosure. However the present disclosure is not limited as such and other sensors including other types of Hall Effect sensors and other types of magnetic sensors may be used with the present disclosure.

Some or all of the sensors 124 may be one-dimensional sensors that can be used to correlate a strength of the magnetic field or a voltage value with an amount of flex of a digit in a single dimension. However, in some embodiments, at least some of the sensors 124 may be three-dimensional sensors that can provide the distance between the magnet 128 and a sensor 124 and multiple dimensions.

In some alternative embodiments of the present disclosure, a three dimensional sensor may be of fixed to each joint of the motion capture glove 122 and a single electromagnetic coil may be affixed to a back of the palm or front of the palm of the motion capture glove 122. The electromagnetic coil may create an electromagnetic field that encapsulates the entire area of the hand enabling each of the three dimensional sensors to generate a voltage based on the electromagnetic field. Further, each sensor may generate an XYZ vector reflecting a strength and/or polarity of the magnetic field at a particular location angle. Using the XYZ vector for each of the sensors, it is possible to determine a configuration of a hand wearing the motion capture glove 122.

In some other alternative embodiments of the present disclosure, an array of three-dimensional sensors may be affixed to the back of the palm in a grid or other known pattern. A single magnet may be affixed to each joint, or to the tip of each digit or other desired position for. The magnet may create a three-dimensional electromagnetic field that encapsulates the area of the hand wearing the motion capture glove 122. Using a grid of voltage values determined by the grid of three-dimensional sensors affixed to the back of the palm of the motion capture glove 122, a configuration of the hand can be determined.

Second Example of a Motion Capture System

Figure 5:
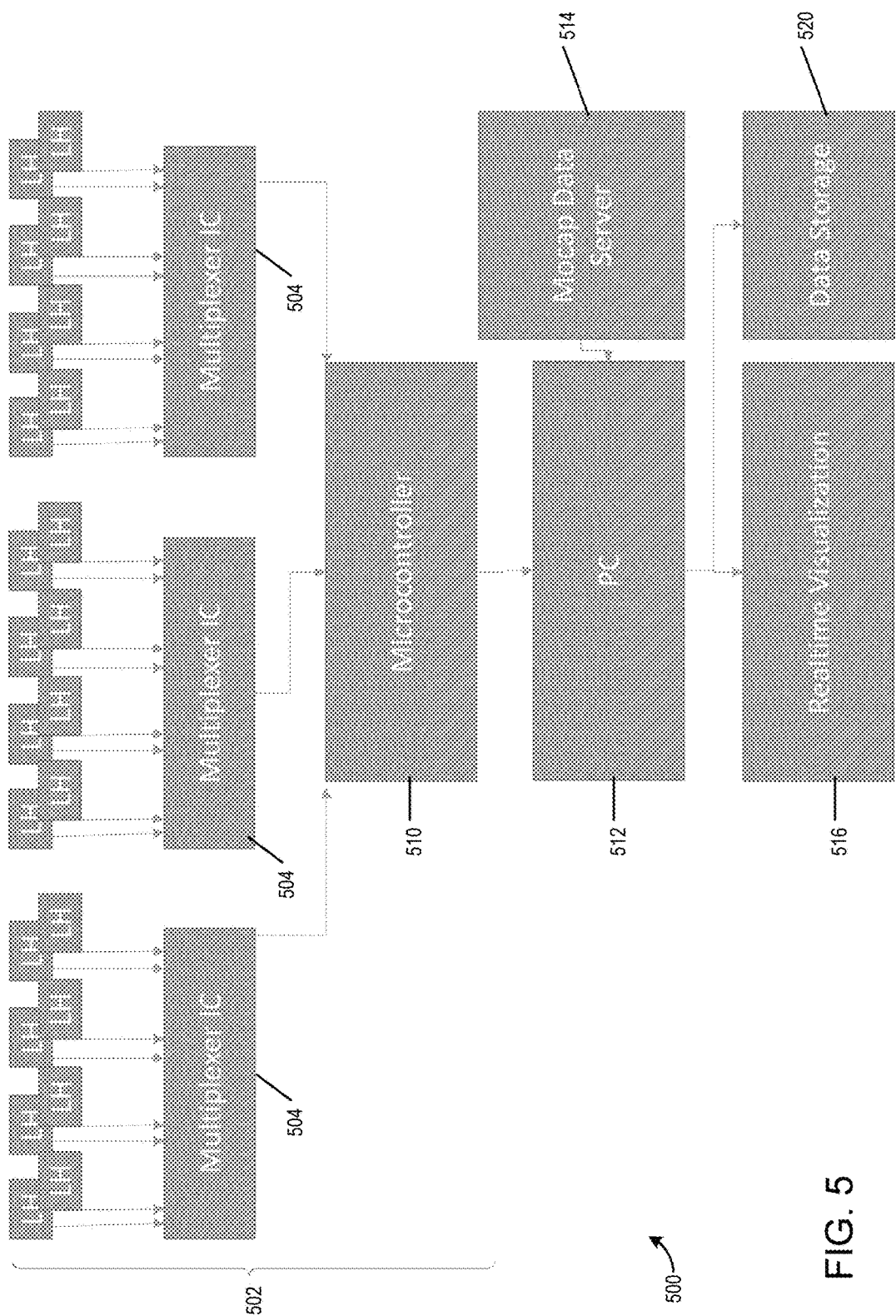
FIG. 5 illustrates an embodiment of a motion capture system that includes a motion capture glove.

FIG. 5 illustrates an embodiment of a motion capture system 500 that includes a motion capture glove 502. The motion capture glove 502 may include a number of Hall Effect sensors. These Hall Effect sensors may be linear Hall effect sensors. In the illustrated embodiment, the motion capture glove 502 includes 24 linear Hall Effect sensors. However, as previously described above with respect to the motion capture glove 122, the motion capture glove 502 may include more or fewer sensors. Each of the linear Hall Effect sensors may be paired with one or more magnets as previously described with respect to the motion capture glove 122. Further, each of the linear Hall Effect sensors may be a one-dimensional Hall Effect sensor that provides an electrical signal based on a distance in a single dimension between the sensor and the magnet. Alternatively, at least some of the Hall Effect sensors may be three-dimensional Hall Effect sensors that can provide angular data or signals measured based on a distance and multiple dimensions between the sensor and one or more magnets.

The motion capture glove 502 may include a number of multiplexers 504 that can regulate or control the timing of reading the sensor signals and providing the sensor signals to a microcontroller 510. In certain embodiments, each of the multiplexers 504 sequentially reads a set of eight sensors. The sensors may be read by the multiplexers 504 at a frequency of up to 240 kHz. In some embodiments the sensors may be read at a higher frequency. However, typically, such a high frequency is unnecessary as a user generally cannot move their fingers that quickly. Thus, in certain embodiments, the sensors may be read at a speed of 60 or 120 Hz. In other embodiments, the sensors may be read at a faster speed or frequency to enable the performance of smoothing or other post-processing by a computer system 512.

In certain embodiments, each of the multiplexers 504 may be connected to more or fewer sensors. For example, in some embodiments, a single multiplexer may be used that can regulate all 24 of the sensors.

The motion capture glove 502 may further include a microcontroller 510 that receives the signals from the multiplexers 504. The signals may be received in an analog form and may be converted into a digital form by the microcontroller 510. The microcontroller 510 may wirelessly communicate the data obtained from the Hall Effect sensors, and analog or digital form, to a computer system 512. In some embodiments, the microcontroller 510 may communicate over a wire to the computer system 512.

In some embodiments, the motion capture server 514 may provide the computer system 512 with additional motion capture data, such as body or facial motion capture data obtained from other motion capture systems. The computer system 512 may combine the data received from the microcontroller 510 the additional motion capture data received from the motion capture server 514 to create an animation based at least in part on the combined motion capture data.

The computer system 512 may create one or more animations from motion capture data received from the controller 510 and/or the motion capture server 514 at any point in time when the motion capture data is available. In some embodiments, to enable the creation of animations at future point in time, motion capture data may be associated with timing information obtained from a global timer, such as the global timer 136. However, in some embodiments, it is desired to view motion capture clips or animation based on motion capture data in real time or near real-time. For example, it may be desirable to view motion capture clips based on motion capture data in real time to determine whether the data being captured is sufficient to create the desired motion capture clips or animations based on the motion capture clips. To enable a user to view motion capture clips in real-time or near real-time, the computer system 512 may provide the motion capture data or motion capture clips based on a motion capture data to a real-time visualization system 516. The real-time visualization system 516 may comprise a display of the computer system 512, an additional computing system configured to output obtained motion capture data or an animation based on the obtained motion capture data, and/or a user interface configured to present the motion capture data or an animation based on the obtained motion capture data to a user.

The motion capture system 500 further includes a data repository 520 that stores motion capture data and/or motion capture clips generated based on the motion capture data received from the motion capture glove 502. In some embodiments, the data repository 520 stores additional body or facial motion capture data received from other motion capture systems. In some embodiments, the data repository 520 may be included as part of the motion capture glove 502 and may store motion capture data obtained by the motion capture glove 502. Further, when included as part of motion capture glove 502, the data repository 520 may serve as a buffer second buffer motion capture data as it is transmitted to the computer system 512.

Prototype Test

Figure 6:
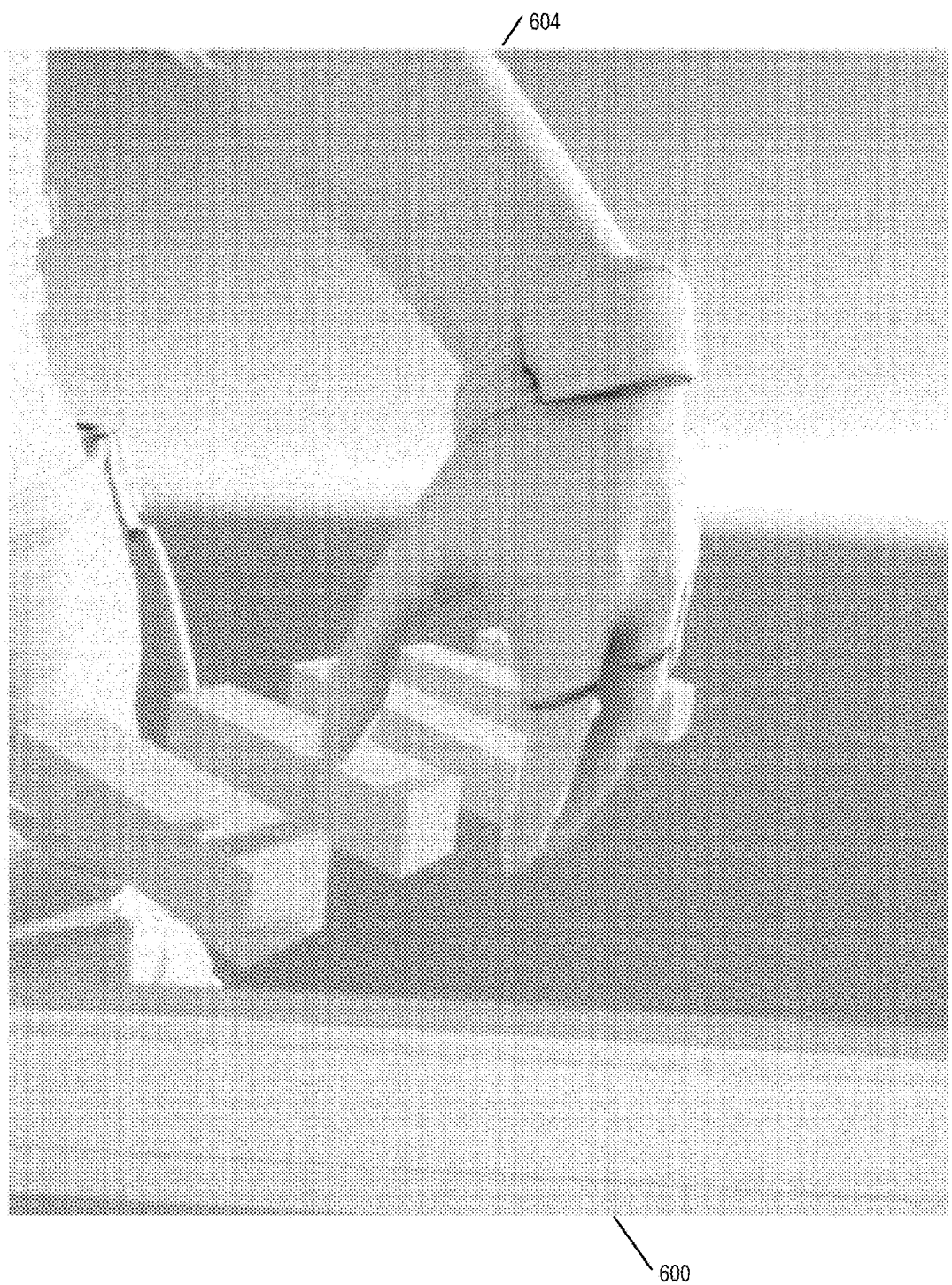
FIG. 6 illustrates an image of a test of a prototype motion capture glove.

FIG. 6 illustrates an image 600 of a test of a prototype motion capture glove. The prototype motion capture glove was created using flexible material to bind a test sensor system to a joint of a digit. As a digit wearing the prototype motion capture glove bends, an animation, based on a character asset from Unity™, illustrated on a screen 604 of the image 600 depicts a corresponding bending movement of the corresponding digit of the hand. In the depicted image, an animation created based on the signals generated by the prototype motion capture glove causes the fingers of the hand to bend towards the blocks depicted on the screen.

Example Motion Capture Glove Calibration Process

Figure 7:
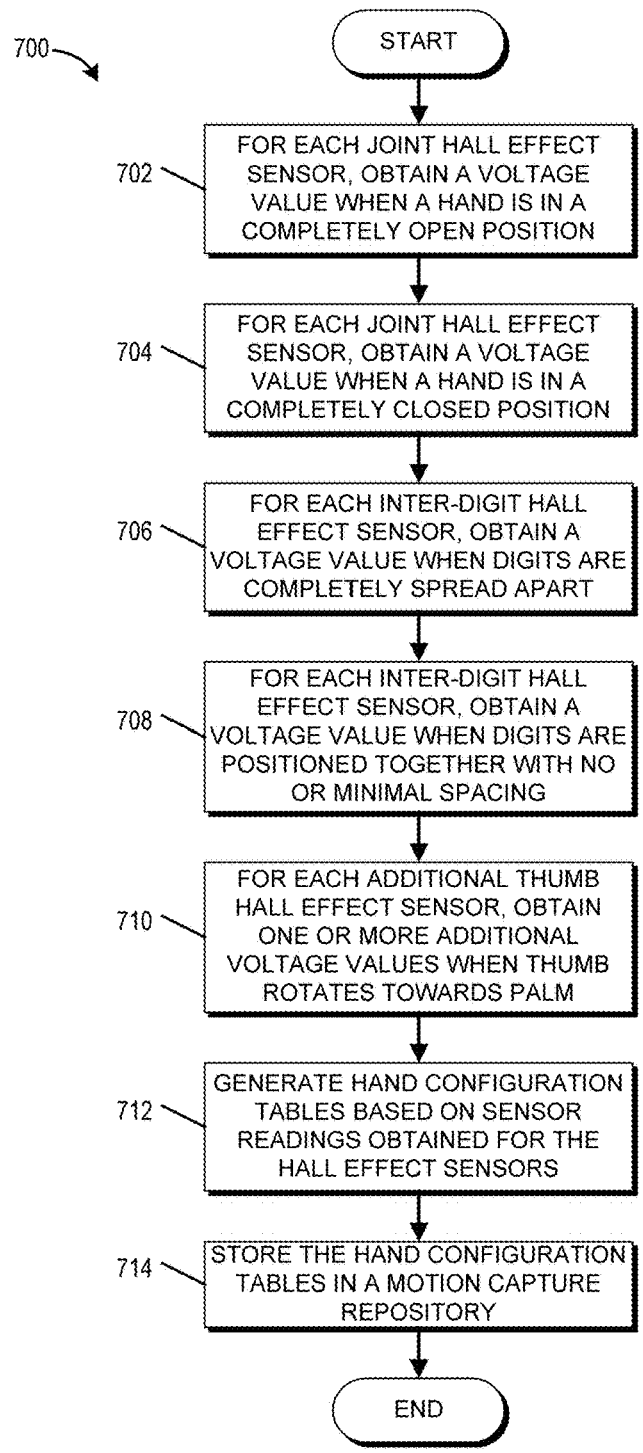
FIG. 7 presents a flowchart of an embodiment of a motion capture glove calibration process.

FIG. 7 presents a flowchart of an embodiment of a motion capture glove calibration process. The process 700 can be implemented by any system that can calibrate a motion capture glove 122. The process 700, in whole or in part, can be implemented by, for example, a motion capture system 120, a motion capture glove 122, a motion capture glove processing system 132, a motion capture video processor 140, a motion capture server 146, or a user computing system 110, among others. Although any number of systems, in whole or in part, can implement the process 700, to simplify discussion the process 700 will be described with respect to particular systems. Further, the process 700, or particular operations of the process 700 may be repeated with each user that wears the motion capture glove 122, before each motion capture session, in response to a command from a computing system or from a user, or at any other time that calibration of the motion capture glove 122 is desired. Although the process 700 is primarily described with respect to the motion capture glove 122, in certain embodiments, the process 700 may be used for calibrating other motion capture systems, such as a motion capture system applied to a foot or toes.

Calibration of the motion capture glove 122 may be optional or omitted in some cases. However, generally, it is desired to calibrate the motion capture glove because, for example, different users have different size hands that may result in differences in the positioning of the sensor systems of the motion capture glove with respect to a user's hand. In some embodiments, the positioning of the sensor systems of the motion capture glove 122 may be adjusted. Alternatively, or in addition, the motion capture glove 122 may be created in different sizes for users of different size hands.

Some users have different levels of flexibility compared to others users, which may result in different motions or range of motion of digits of the hand of the users. For example, some users cannot bend their fingers towards a dorsum, or the back of the palm, of the hand from an open face position (for example, the position obtain when a hand lays flat on a desk) of the hand, while some other users can bend their fingers backwards. Moreover, some users may have differences in hands due to loss of digits, damage to the hand, or birth deformities. Thus, it is generally desirable to calibrate the motion capture glove 122 at least once prior to use by a particular user to determine a full range of motion of a hand of the particular user.

The process 700 begins at block 702 where the motion capture glove processing system 132, for each joint Hall Effect sensor 124, obtains a voltage value when a hand wearing the motion capture glove 122 is in a completely open position. A completely open position may be a position where the hand aligns with a vertical or horizontal coordinate axis. In other embodiments, for users with double-jointed digits, or hypermobility, or unusual flexibility, the completely open position may be a position where one or more digits of the hand bends backwards towards a dorsum of the hand beyond a vertical or horizontal coordinate axis when the palm of the hand is aligned with the vertical or horizontal coordinate axis. Although the process 700 is primarily described with respect to measuring voltage values, alternatively, or in addition, current values or other electrical values may be obtained using a sensor, such as a Hall Effect sensor.

At block 704, for each joint Hall Effect sensor 124, the motion capture glove processing system 132 obtains a voltage value when the hand wearing the motion capture glove 122 is in a completely closed position. The completely closed position may be a position where the hand forms a fist. In other embodiments, the completely closed position may be positioned where the hand grasps an object. In some embodiments, the completely closed position may be less than a fully formed this to you, for example, deformities to the hand.

At block 706, for each inter-digit Hall Effect sensor, the motion capture glove processing system 132 obtains a voltage value when digits of a hand wearing the motion capture glove 122 are completely spread apart. Digits may be completely spread apart when each digit is as far away from each neighboring digit is possible for the particular user. The digits typically include the fingers and a thumb. However, in certain embodiments, the digits may be limited to the fingers and the thumb may have a separate configuration of sensors. In some such embodiments, the voltage values for the sensors positioned on the thumb may also be read as part of the process 700.

At block 708, for each inter-digit Hall Effect sensor, the motion capture glove processing system 132 obtains a voltage value when digits of a hand wearing the motion capture glove 122 are positioned together with no or minimal spacing between each digit. When obtaining the voltage signals at the block 706 and 708 the hand may be in a completely open position. In other embodiments, the hand may be partially open or partially closed with the digits pressed together are separated when determining the voltage values at the block 706 and 708.

At block 710, for each additional thumb Hall Effect sensor, the motion capture glove processing system 132 obtains one or more additional voltage values when a thumb of a hand wearing the motion capture glove 122 rotates towards a palm of the hand. In some embodiments, the motion capture glove 122 does not include additional thumb Hall Effect sensors. However, in certain embodiments, one or more of the sensors located on a thumb of the motion capture glove 122 are capable of capturing signals or voltage values as the thumb rotates towards or away from the palm of the hand wearing the motion capture glove 122. For example, in some embodiments, a sensor may be placed on a tip or pad of a thumb of the magnet may be positioned on a palm of the hand. As the thumb rotates towards the palm of the hand the voltage signal is generated may vary enabling determination of the amount of rotation of the thumb with respect to a palm of the hand. The voltage values for when the thumb is in a non-rotated position or rotated 0° may be determined as part of the blocks 706 and 708.

At block 712, the motion capture glove processing system 132 generates one or more hand configuration tables based at least in part on the sensor readings obtained for the Hall Effect sensors at blocks 702 through 710. The configuration tables may be linear tables that map different voltage readings to different configurations of the digits of the hand wearing the motion capture glove 122. Alternatively, or in addition, at least some of the configuration tables may use a curve fit or exponential fit to map positions of the digits of the hand to different voltage values, or other electrical values. In certain embodiments, instead of or in addition to generating a table of mappings between voltage values in the configuration of digits of the hand, one or more formulas are equations may be generated based on voltage values obtained four defined configurations of the hand. For example, based at least in part on the first set of voltage values obtained when a hand is completely open and on a second set of voltage values obtained when a hand is completely closed as a fist, a formula may be derived for determining a configuration of the hand when voltage values are obtained that are between the first set of voltage values and the second set of voltage values. In some embodiments, a hand configuration table may be generated for each sensor of the motion capture glove 122. In other embodiments, a hand configuration table may be generated for each digit, for each portion of the hand, or for the entire motion capture glove 122. In some embodiments, one or more of the hand configuration tables may be based at least in part on information provided by a manufacturer of the Hall Effect sensors. For example, a manufacturer may specify a voltage or provide a table of voltage values that are generated when the sensor is within a particular distance of a magnet. Using the manufacturer information and the calibration information, a table can be generated that correlates the voltage readings of the sensors 124 with the curvature of digits or the configuration of a hand wearing the motion capture glove 122.

At block 714, the motion capture glove processing system 132 stores the one or more hand configuration tables in a motion capture repository 144. The one or more hand configuration tables may be associated with a particular user at the motion capture repository 144. During use of the motion capture glove 122, the one or more hand configuration tables associated with the particular user may be loaded when the identity of the particular user is specified.

In some embodiments, the voltage values obtained during performance of the process 700 may be converted into values that represent an X, Y, or Z position of one or more digits or portions of digits of the hand. These X, Y, or Z positions may be stored as the hand configuration tables or as part of the hand configuration tables.

Example Hand Configuration Determination Process

Figure 8:
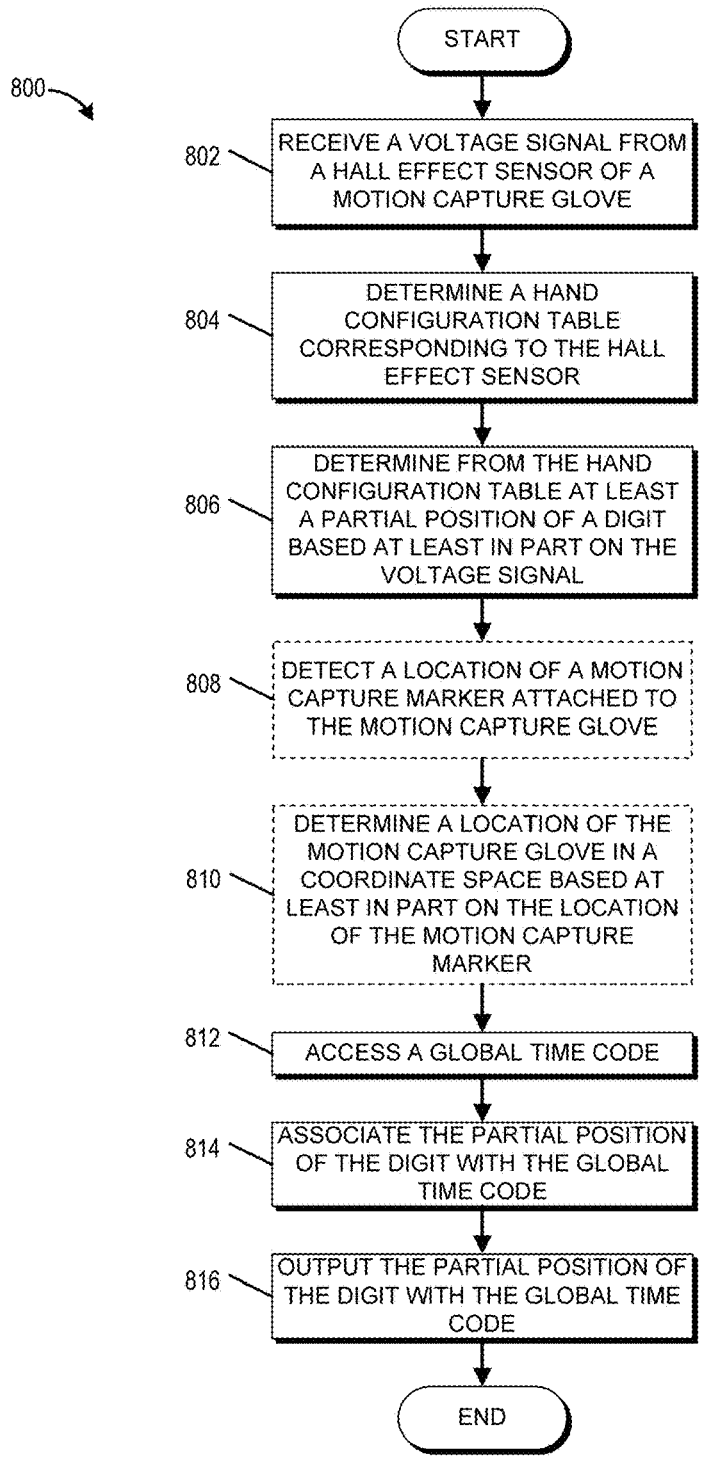
FIG. 8 presents a flowchart of an embodiment of a hand configuration determination process.

FIG. 8 presents a flowchart of an embodiment of a hand configuration determination process 800. The process 800 can be implemented by any system that can use a motion capture glove 122 to determine a configuration of a hand that is wearing the motion capture glove 122. The process 800, in whole or in part, can be implemented by, for example, a motion capture system 120, a motion capture glove 122, a motion capture glove processing system 132, a motion capture video processor 140, a motion capture server 146, or a user computing system 110, among others. Although any number of systems, in whole or in part, can implement the process 800, to simplify discussion the process 800 will be described with respect to particular systems. Further, the process 800, or particular operations of the process 800 may be repeated for each sensor included on the motion capture glove 122 enabling determination of a configuration of an entire hand wearing the motion capture glove 122. In addition, the process 800 may be performed continuously or intermittently. Advantageously, in certain embodiments, performing the process 800 continuously or intermittently enables motion of the hand wearing the motion capture glove 122 to be detected or determined. Although the process 800 is primarily described with respect to the motion capture glove 122, in certain embodiments, the process 800 may be used for obtaining motion capture data and/or creating motion capture clips for other portions of a user, such as a motion capture system applied to a foot or toes.

The process 800 begins at block 802 where the motion capture glove processing system 132 receives a voltage signal from a Hall Effect sensor 124 of the motion capture glove 122. As previously described, in certain embodiments, an additional or alternative electrical signal, such as a current signal, may be received from the sensor 124. In some embodiments, a logical signal may be a measure of the magnetic field strength, which may be measured in milliteslas or microteslas.

Further, in certain embodiments, the Hall Effect sensor 124 may be supplemented by or replaced by a different typological sensor, such as an AMR sensor. The Hall Effect sensor 124 may be a joint Hall Effect sensor positioned above a joint of the digit of a hand wearing the motion capture glove 122. Alternatively, the Hall Effect sensor 124 may be an inter-digit Hall Effect sensor positioned between two digits of a hand wearing the motion capture glove 122. In certain embodiments, the Hall Effect sensor 124 may be a thumb sensor that is positioned on a portion of the thumb to facilitate detecting the rotation of the thumb with respect to the rest of the hand that includes the thumb.

At block 804, the motion capture glove processing system 132 determines a hand configuration table corresponding to the Hall Effect sensor 124. In certain embodiments, the hand configuration table is determined based on an identity of the Hall effect sensor 124 that provided the voltage signal at the block 802. In some such embodiments, an identifier corresponding to the Hall Effect sensor 124 is received with the voltage signal at the block 802. In some cases, a hand configuration table is identified based at least in part an identity of the motion capture glove 122 or an identity of a user 102 wearing the motion capture glove 122. In some cases, a microcontroller of the motion capture glove 122 specifies the Hall Effect sensor 124 that provided the voltage signal at the block 802.

Determining the hand configuration table may include accessing our loading the hand configuration table. In some embodiments, the hand configuration table is obtained from a motion capture repository 144. In other embodiments, the hand configuration table may be obtained from a motion capture glove 122 or from the storage of the motion capture glove processing system 132.

At block 806, the motion capture glove processing system 132 determines, based at least in part on the hand configuration table, at least a partial position of a digit based at least in part on the voltage signal obtained at the block 802. Determining at least a partial position of the digit may include determining an amount of bend or curvature for a joint of the digit based on a mapping between the voltage signal and the configuration of the digit as stored in the hand configuration table. Alternatively, or in addition, determining at least a partial position of the digit may include determining an amount of space between the digit and a neighboring digit based on a mapping between the voltage signal and the spacing of the digit in the neighboring digit as stored in the hand configuration table. Alternatively, or in addition, determining at least a partial position of the digit may include determining an amount of rotation between the digit (for example, the thumb) based on a mapping between the voltage signal and the rotation of the digit as stored in the hand configuration table.

In some embodiments, the block 804 involves determining or identifying a formula corresponding to the Hall effect sensor 124 that provided the voltage signal at the block 802. In some such embodiments, the block 806 involves calculating a configuration of the digit by applying the voltage signal received at the block 802 to the determined are identified formula corresponding to the Hall Effect sensor 124 that provided the voltage signal at the block 802.

At block 808, the motion capture camera 134 detects a location of a motion capture marker 126 attached to the motion capture glove 122. Detecting the location of the motion capture marker 126 may enable detection of a location of the motion capture glove 122 in a coordinate space. In some embodiments, the block 808 may include detecting a location of multiple motion capture markers 126 attached to the motion capture glove 122. Detecting the location of multiple motion capture markers 126 (e.g., three motion capture markers) may enable detection of a location and orientation of the motion capture glove 122 in a coordinate space. The location of motion capture marker 126 may be detected using an optical sensor.

At block 810, the motion capture glove processing system 132 determines a location of the motion capture glove 122 in a coordinate space based at least in part on the location of one or more motion capture markers 126 determined at the block 808. As stated above, the user of multiple motion capture markers 126 may enable the determination of both location and orientation of the motion capture glove 122 in the coordinate space. The location of the motion capture glove 122 in the coordinate space may be used to determine a location of the hand wearing the motion capture glove 122 in a coordinate space, such as a three dimensional Euclidean space. Alternatively, or in addition, the block 810 may include determining the location of the hand within one or more other coordinate spaces, such as a quaternion coordinate space.

In some embodiments, a single motion capture marker 126 may be used with an inertial measurement unit (IMU). The IMU may be or may include an accelerometer. Alternatively, or in addition, the IMU may be a gyroscope and/or magnetometer designed for several axes of measurement, such as 3, 6, or 9 axes of measurement. A single motion capture marker 126 can be located on the back of the motion capture glove 122 to track the x, y, and z position within a coordinate space for the motion capture glove 122. The IMU can also be attached to the back of the motion capture glove 122 and can be used to supply orientation data. This orientation data can be combined with the x, y, and z position data to obtain both a location and orientation of the motion capture glove 122. Although it is possible to determine both location and orientation in a coordinate space of the motion capture glove 122 using a single motion capture marker 126 and an IMU, in certain embodiments, the motion capture glove 122 may include a plurality of motion capture markers 126 along with one or more IMUs enabling a greater amount of precision when determining the location and/or orientation of the motion capture glove 122.

In certain embodiments, the blocks 808 and 810 may be optional or omitted. For example, in some embodiments, an animator may be interested in a configuration of the hand, but may not need information regarding the location of the hand within a particular coordinate space.

At block 812, the motion capture glove processing system 132 accesses a global time code from the global timer 136. At block 814, the motion capture glove processing system 132 associates the partial position of the digit with the global time code obtained at the block 812. The global time code may be used to coordinate our otherwise match the motion capture data obtained by the motion capture glove 122 for a hand of the user with motion capture data obtained for other body parts of the user or for body parts of another user. It should be understood that the global time code applied to the motion capture data may or may not correspond to real world time. For example, the motion capture data obtained for a hand of the user may be obtained at a different time periods than motion capture data for a face of the user. However the motion capture data for the hand of the user and the motion capture data from the face of the user may be associated with the same time code enabling the motion capture data of the hand and the motion capture data of the face of the user to be used to generate the same for a set of frames of an animation.

At block 816, the motion capture glove processing system 132 outputs the partial position of the digit with the global time code. Outputting the partial position of the digit may include storing motion capture data corresponding to the partial position of the digit, with or without the global time code, a motion capture repository 144. The motion capture data may correspond to values that can be mapped to one or more animation models to create an animation of the hand. Alternatively, or in addition, outputting the partial position of the digit may include storing, at the motion capture repository 144, a motion capture clip or an animation corresponding to our generated based at least in part on the motion capture data. In some embodiments, outputting the partial position of the digit may include outputting an animation or motion capture clip on a display of a computing system, such as the user computing system 110, for presentation to a user.

In some embodiments, the voltage signals received at the block 802 may be converted into coordinate values, such as X, Y, or Z coordinate values. Using the hand configuration table obtained at the block 804, the configuration of the hand or configuration of a digit of the hand may be determined based at least in part on the X, Y, or Z coordinate values determined from the measured voltage values received at the block 802.

In some embodiments, the process 800 may include performing a filtering process on the voltage signal received at the block 802 prior to mapping the voltage signal to the hand configuration table or prior to determining the partial position of the digit at the block 806 based at least in part on the voltage signal. The filtering process may include filtering the voltage component generated in response to detection of a magnetic field generated by a magnet 128 of a different sensor system 130 than a sensor system 130 that includes the Hall Effect sensor 124 is voltage is received at the block 802. Alternatively, or in addition, the filtering process may include filtering noise generated by other electrical or wireless signals that may modulate or otherwise affect the voltage signal received at the block 802.

In some embodiments, the process 800 may include determining multiple voltage signals from the Hall Effect sensor at the block 802. In some such embodiments, the configuration of the corresponding digit may be determined based at least in part on performing an interpolation (for example a lerp or linear interpolation) or otherwise fitting the voltage signal to a curve identified in the hand configuration table. Moreover, in some embodiments, the voltage signal received at the block 802 may correspond to multiple axes of freedom. In some such embodiments, the block 806 may include determining the configuration of a corresponding digit and multiple coordinate axes.

Advantageously, in certain embodiments, the use of sensors paired with corresponding magnets around the joints of the digits of the hand and/or the use of sensors paired with corresponding magnets between the digits of the hand enables a fine-grain determination of the configuration of the hand regardless of whether or not the hand may be obscured by other objects or maybe obscured by other portions of the hand. For example, using the motion capture glove 122, it is possible to obtain motion capture data for a hand of the user even when the user crosses one or more digits of the hand or blocks the hand from view of a motion capture camera 134, which may occur, for example, when a user moves the hand behind the user's other hand or some other object.

Overview of Computing System

Figure 9:
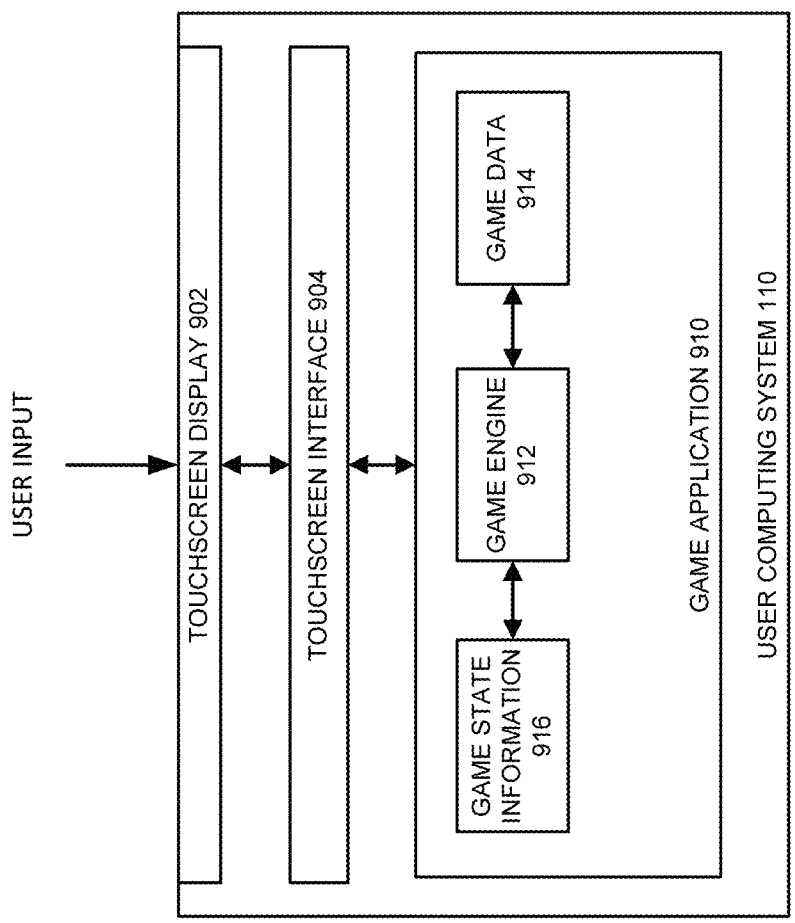
FIG. 9 illustrates an embodiment of a user computing system.

FIG. 9 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 9, the user computing system 110 is a touch-capable computing device capable of receiving input from a user via a touchscreen display 902. However, the user computing system 110 is not limited as such and may include non-touch capable embodiments, which do not include a touchscreen display 902.

The user computing system 110 includes a touchscreen display 902 and a touchscreen interface 904, and is configured to execute a game application. This game application 910 may be the video game 112. Although described as a game application 910, in some embodiments the application 910 may be another type of application that may be capable of interacting with multiple users across multiple user computing systems, such as educational software or language software. While user computing system 110 includes the touchscreen display 902, it is recognized that a variety of input devices may be used in addition to or in place of the touchscreen display 902.

The user computing system 110 can include one or more processors, such as central processing units (CPUs), graphics processing units (GPUs), and accelerated processing units (APUs). Further, the user computing system 110 may include one or more data storage elements. In addition, the user computing system 110 may include one or more volatile memory elements, such as random-access memory (RAM). In some embodiments, the user computing system 110 can be a specialized computing device created for the purpose of executing game applications 910. For example, the user computing system 110 may be a video game console. The game applications 910 executed by the user computing system 110 may be created using a particular application programming interface (API) or compiled into a particular instruction set that may be specific to the user computing system 110. In some embodiments, the user computing system 110 may be a general purpose computing device capable of executing game applications 910 and non-game applications. For example, the user computing system 110 may be a laptop with an integrated touchscreen display or desktop computer with an external touchscreen display. Components of an example embodiment of a user computing system 110 are described in more detail with respect to FIG. 10.

The touchscreen display 902 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 902. The touchscreen interface 904 can be configured to translate the touch input into data and output the data such that it can be interpreted by components of the user computing system 110, such as an operating system and the game application 910. The touchscreen interface 904 can translate characteristics of the tactile touch input touch into touch input data. Some example characteristics of a touch input can include, shape, size, pressure, location, direction, momentum, duration, and/or other characteristics. The touchscreen interface 904 can be configured to determine the type of touch input, such as, for example a tap (for example, touch and release at a single location) or a swipe (for example, movement through a plurality of locations on touchscreen in a single touch input). The touchscreen interface 904 can be configured to detect and output touch input data associated with multiple touch inputs occurring simultaneously or substantially in parallel. In some cases, the simultaneous touch inputs may include instances where a user maintains a first touch on the touchscreen display 902 while subsequently performing a second touch on the touchscreen display 902. The touchscreen interface 904 can be configured to detect movement of the touch inputs. The touch input data can be transmitted to components of the user computing system 110 for processing. For example, the touch input data can be transmitted directly to the game application 910 for processing.

In some embodiments, the touch input data can undergo processing and/or filtering by the touchscreen interface 904, an operating system, or other components prior to being output to the game application 910. As one example, raw touch input data can be captured from a touch input. The raw data can be filtered to remove background noise, pressure values associated with the input can be measured, and location coordinates associated with the touch input can be calculated. The type of touch input data provided to the game application 910 can be dependent upon the specific implementation of the touchscreen interface 904 and the particular API associated with the touchscreen interface 904. In some embodiments, the touch input data can include location coordinates of the touch input. The touch signal data can be output at a defined frequency. Processing the touch inputs can be computed many times per second and the touch input data can be output to the game application for further processing.

A game application 910 can be configured to be executed on the user computing system 110. The game application 910 may also be referred to as a video game, a game, game code and/or a game program. A game application should be understood to include software code that a user computing system 110 can use to provide a game for a user to play. A game application 910 might comprise software code that informs a user computing system 110 of processor instructions to execute, but might also include data used in the playing of the game, such as data relating to constants, images and other data structures. For example, in the illustrated embodiment, the game application includes a game engine 912, game data 914, and game state information 916. As previously stated, the embodiments described herein may be used for applications other than video games, such as educational software or videoconferencing. Thus, in some such cases, the game application 910 may be substituted with other types of applications that may involve multiple users communicating over a network and selecting a server, or one of the plurality of user computing systems, to act as a host.

The touchscreen interface 904 or another component of the user computing system 110, such as the operating system, can provide user input, such as touch inputs, to the game application 910. In some embodiments, the user computing system 110 may include alternative or additional user input devices, such as a mouse, a keyboard, a camera, a game controller, and the like. Further, the user computing system 110 may include a virtual reality display and/or an augmented reality display. A user can interact with the game application 910 via the touchscreen interface 904 and/or one or more of the alternative or additional user input devices. The game engine 912 can be configured to execute aspects of the operation of the game application 910 within the user computing system 110. Execution of aspects of gameplay within a game application can be based, at least in part, on the user input received, the game data 914, and game state information 916. The game data 914 can include game rules, prerecorded motion capture poses/paths, environmental settings, constraints, animation reference curves, skeleton models, and/or other game application information. Further, the game data 914 may include information that is used to set or adjust the difficulty of the game application 910.

The game engine 912 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 910, the game application 910 can store game state information 916, which can include character states, environment states, scene object storage, and/or other information associated with a state of execution of the game application 910. For example, the game state information 916 can identify the state of the game application at a specific point in time, such as a character position, character action, game level attributes, and other information contributing to a state of the game application.

The game engine 912 can receive the user inputs and determine in-game events, such as actions, collisions, runs, throws, attacks and other events appropriate for the game application 910. During operation, the game engine 912 can read in game data 914 and game state information 916 in order to determine the appropriate in-game events. In one example, after the game engine 912 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

In some cases, at least some of the video game engine 912 may reside on a server, such as one of the video game servers 152. Further, in some cases, the complete video game engine 912 may reside on the server. Thus, in some cases, the video game engine 912 may be omitted from the portion of the video game application 910 hosted on the user computing system 110. Similarly, in some embodiments, video game state information 916 and video game data 914 may be hosted on a server in addition to or instead of on the user computing system 110. Further, in some cases, actions of the user performed within the video game application 910 may be transmitted to a server that is hosting a portion of the video game 910. The server may compute or determine the result of the user's interaction with respect to the video game application 910, such as collisions, attacks, or movements. The server may then send a result of the user's actions to the video game application 910 on the user computing system 110. The video game application 910 may then perform an action in response to the result, such as displaying the result to the user.

Example Hardware Configuration of Computing System

Figure 10:
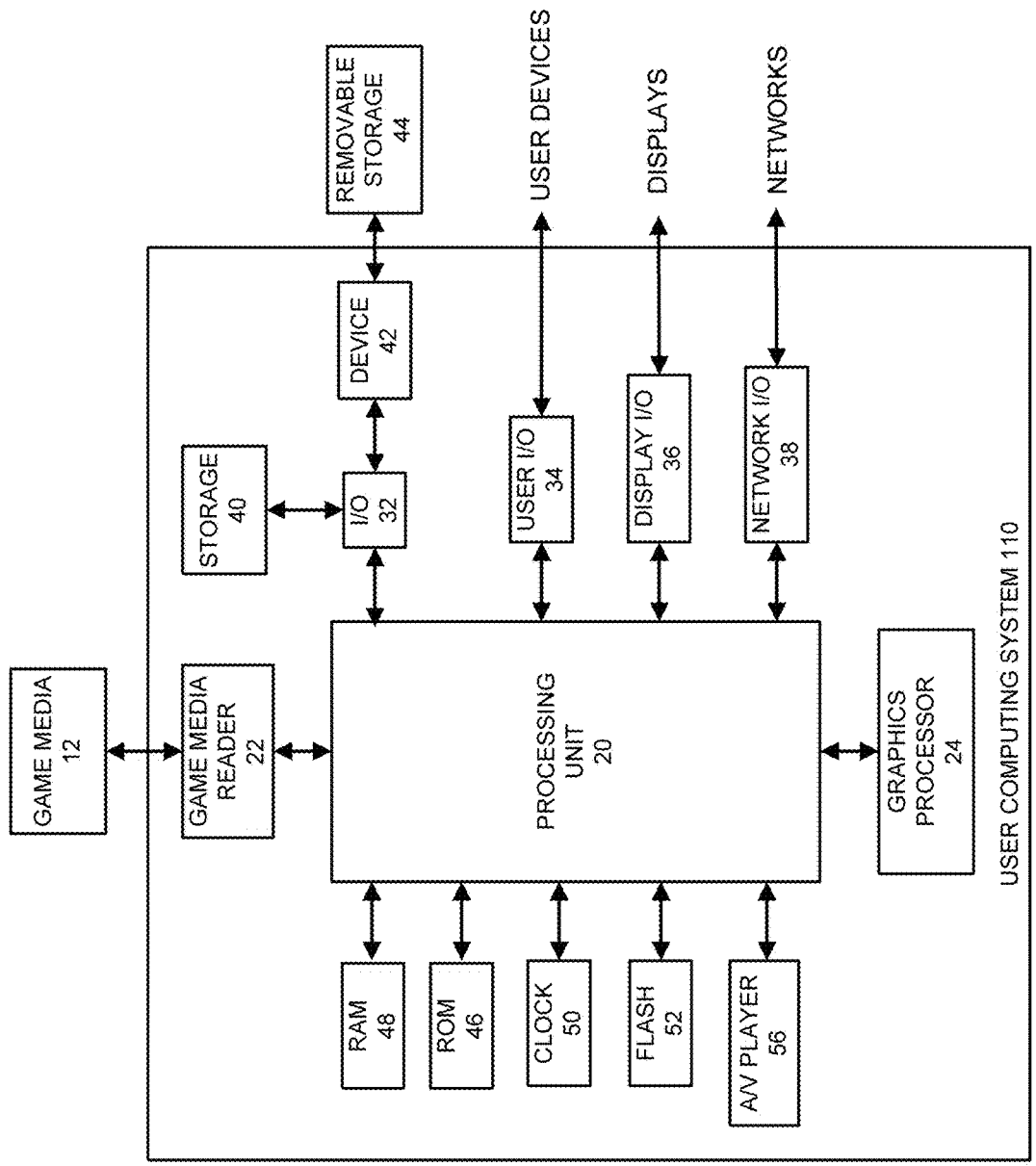
FIG. 10 illustrates an embodiment of a hardware configuration for the user computing system of FIG. 9.

FIG. 10 illustrates an embodiment of a hardware configuration for the user computing system 110 of FIG. 9. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 10) as described with respect to FIG. 9, the user computing system 110 may optionally include a touchscreen display 902 and a touchscreen interface 904.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, the user computing system 110 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A motion capture glove comprising:
   a glove configured to at least partially cover a hand of a user; and
   a set of joint magnetic sensor systems attached to the glove, wherein a first joint magnetic sensor system from the set of joint magnetic sensor systems is positioned such that the joint magnetic sensor system is located above a joint of the hand when the glove is worn by the user, wherein each of the other joint magnetic sensor systems from the set of joint magnetic sensor systems is positioned over a different joint of the hand than the first joint magnetic sensor system, wherein the first joint magnetic sensor system produces a voltage signal based at least in part on a position of a first magnetic sensor with respect to a first corresponding magnet of the first joint magnetic sensor system, and wherein the voltage signal corresponds to a configuration of the joint of the hand when the glove is worn by the user, wherein the configuration of the joint of the hand is determined based at least in part on a hand configuration table generated, at least in part, by a processor configured to at least:
      determine a first electrical signal of the first joint magnetic sensor system when the hand is in a first position;
      determine a second electrical signal of the first joint magnetic sensor system when the hand is in a second position;
      perform an interpolation process based at least in part on the first electrical signal determined when the hand is in the first position and the second electrical signal determined when the hand is in the second position to determine a plurality of electrical signals corresponding to a plurality of hand configurations between the first position and the second position; and
      generate the hand configuration table based at least in part on a result of the interpolation process.

2. The motion capture glove of claim 1, further comprising a set of inter-digit magnetic sensor systems attached to the glove, wherein each inter-digit magnetic sensor system is positioned between a pair of digits of the hand when the glove is worn by the user.

3. The motion capture glove of claim 2, wherein at least one inter-digit magnetic sensor system of the set of inter-digit magnetic sensor systems comprises a three dimensional sensor, wherein the three dimensional sensor is configured to determine a location of the three dimensional sensor relative to a corresponding magnet.

4. The motion capture glove of claim 1, further comprising one or more thumb magnetic sensor systems attached to the glove, wherein the one or more thumb magnetic sensor systems provide one or more voltage values reflective of a rotation of a thumb of the hand with respect to a palm of the hand.

5. The motion capture glove of claim 1, wherein the set of joint magnetic sensor systems comprise Hall Effect sensors.

6. The motion capture glove of claim 1, wherein the glove comprises flexible circuitry.

7. The motion capture glove of claim 1, wherein the glove comprises a set of flexible joint sheaths that house the set of joint magnetic sensor systems.

8. The motion capture glove of claim 1, further comprising a wireless transceiver configured to communicate data that is based at least in part on one or more signals generated by the set of joint magnetic sensor systems to a computing device configured to determine a physical configuration of the hand based at least in part on the one or more signals.

9. The motion capture glove of claim 1, wherein at least some of the joint magnetic sensor systems comprise a hinged sensor system comprising a magnetic sensor and a neodymium magnet.

10. The motion capture glove of claim 9, wherein the hinged sensor system includes a gap between the magnetic sensor and the neodymium magnet enabling the hinge to bend at least partially backward when the glove is worn by the user and the user is capable of bending a digit at least partially towards a dorsum of the hand from an open flat position.

11. The motion capture glove of claim 1, further comprising a microcontroller configured to:
   obtain the first electrical signal and the second electrical signal from the first joint magnetic sensor system and to provide the microprocessor;
   convert the first electrical signal and the second electrical signal into data; and
   provide the data to the processor indicative of the first electrical signal and the second electrical signal enabling the processor to perform said interpolation process and to generate the hand configuration table.

12. A motion capture system comprising:
   a motion capture glove comprising:
      a glove configured to at least partially cover a hand of a user; and
      a set of magnetic sensor systems attached to the glove, wherein a first magnetic sensor system of the set of magnetic sensor systems generates a first signal based at least in part on a location of a first corresponding magnet, the first signal indicative of a configuration of a first portion of the hand of the user; and
   a motion capture glove processor configured to receive the first signal generated by the first magnetic sensor system and to determine the configuration of the first portion of the hand of the user based at least in part on the first signal and one or more hand configuration tables that map the first signal to the configuration of the first portion of the hand, wherein the motion capture glove processor is further configured to generate a hand configuration table of the one or more hand configuration tables by at least:

determining a first electrical signal of the first magnetic sensor system when the hand is in a first position;

determining a second electrical signal of the first magnetic sensor system when the hand is in a second position;

performing an interpolation process based at least in part on the first electrical signal determined when the hand is in the first position and the second electrical signal determined when the hand is in the second position to determine a plurality of electrical signals corresponding to a plurality of hand configurations between the first position and the second position; and generating the hand configuration table based at least in part on a result of the interpolation process.

13. The motion capture system of claim 12, further comprising a motion capture marker attached to the motion capture glove, wherein a motion capture video processor determines a location of the hand in a coordinate space based at least in part on a determination of a location of the motion capture marker.

14. The motion capture system of claim 12, further comprising a motion capture video processor configured to generation a motion capture animation clip based at least in part on the configuration of the first portion of the hand.

15. The motion capture system of claim 12, wherein a second magnetic sensor system of the set of magnetic sensor systems generates a second signal based at least in part on a location of a second corresponding magnet, the second signal indicative of a configuration of a second portion of the hand of the user that differs from the first portion of the hand, and wherein the motion capture glove processor is further configured to receive the second signal generated by the second magnetic sensor system and to determine the configuration of the second portion of the hand of the user based at least in part on the second signal and one or more hand configuration tables that map the second signal to the configuration of the second portion of the hand.

16. The motion capture system of claim 12, further comprising a microcontroller configured to read the first signal from the first magnetic sensor system and to provide the first signal to the motion capture glove processor.

17. The motion capture system of claim 12, further comprising a multiplexer configured to read signals produced by the set of magnetic sensor systems and to distribute the first signal to a microcontroller responsive to a request for a signal from the first magnetic sensor.

18. A computer-implemented motion capture method, the method comprising:

receiving an electrical signal from a magnetic sensor system of a motion capture glove;

determining a hand configuration table corresponding to the magnetic sensor;

determining from the hand configuration table at least a partial position of a digit of a hand wearing the motion capture glove based at least in part on the electrical signal;

accessing a global time code;

associating the global time code with the partial position of the digit of the hand; and generating a motion capture video clip based at least in part on the partial position of the digit of the hand and the global time code, wherein the hand configuration table is generated by a calibration process, the calibration process comprising:

determining a first electrical signal of the magnetic sensor system when the hand is in a first position corresponding to a completely open hand;

determining a second electrical signal of the magnetic sensor system when the hand is in a second position corresponding to a closed fist;

performing an interpolation process based at least in part on the first electrical signal determined when the hand is in the first position and the second electrical signal determined when the hand is in the second position to determine a plurality of electrical signals corresponding to a plurality of hand configurations between the completely open hand and the closed fist; and generating the hand configuration table based at least in part on a result of the interpolation process.

19. The method of claim 18, wherein the electrical signal comprises a voltage signal.

20. The method of claim 18, further comprising:

detecting a location of a motion capture marker attached to the motion capture glove; and determining a location of the motion capture glove in a coordinate space based at least in part on the location of the motion capture marker, wherein the motion capture video clip is based at least in part on the location of the motion capture glove in the coordinate space.

* * * * *